(12) United States Patent
Lever et al.

(10) Patent No.: US 9,107,385 B2
(45) Date of Patent: Aug. 18, 2015

(54) ANIMAL KENNEL FOR SCIENTIFIC EXAMINATION

(71) Applicant: The Curators of the University of Missouri, Columbia, MO (US)

(72) Inventors: Teresa E. Lever, Columbia, MO (US); Joan Coates, Columbia, MO (US); Mitchell Allen, Columbia, MO (US); Laila Al-Khashti, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 46 days.

(21) Appl. No.: 13/863,147

(22) Filed: Apr. 15, 2013

(65) Prior Publication Data

US 2014/0305378 A1    Oct. 16, 2014

(51) Int. Cl.
*A01K 1/03*    (2006.01)

(52) U.S. Cl.
CPC . *A01K 1/03* (2013.01); *A01K 1/031* (2013.01); *A01K 1/033* (2013.01); *A01K 1/034* (2013.01)

(58) Field of Classification Search
CPC ....... A01K 1/031; A01K 1/034; A01K 1/033; A01K 1/03; A01K 1/035; A01K 31/06; A01K 31/07
USPC ......... 119/417, 441, 475, 452–454, 472, 477, 119/481, 482, 501, 61.57; 135/87, 135/147–150, 157
See application file for complete search history.

(56) References Cited

U.S. PATENT DOCUMENTS

| | | | | |
|---|---|---|---|---|
| 1,752,098 A | * | 3/1930 | Macomber | 220/485 |
| 4,137,870 A | * | 2/1979 | Cano | 119/712 |
| 4,581,754 A | | 4/1986 | Donovan | |
| 4,934,320 A | | 6/1990 | Cresap, III | |
| 5,603,288 A | * | 2/1997 | Ferber | 119/751 |
| 5,738,042 A | * | 4/1998 | King | 119/464 |
| 5,832,872 A | | 11/1998 | Pearce | |
| D533,971 S | * | 12/2006 | Carter et al. | D30/108 |
| 7,648,044 B2 | * | 1/2010 | Reinsel et al. | 221/35 |
| 8,127,719 B2 | * | 3/2012 | Jakubowski et al. | 119/499 |
| 8,146,534 B1 | * | 4/2012 | Robertson | 119/61.54 |
| 2004/0065361 A1 | * | 4/2004 | Pratt et al. | 135/148 |
| 2010/0269260 A1 | | 10/2010 | Lanz et al. | |
| 2012/0046641 A1 | | 2/2012 | Jedwab et al. | |
| 2012/0085291 A1 | * | 4/2012 | Conger et al. | 119/419 |
| 2012/0186529 A1 | * | 7/2012 | Cantwell et al. | 119/474 |
| 2012/0210947 A1 | * | 8/2012 | Dipaolo | 119/472 |
| 2014/0150728 A1 | * | 6/2014 | Tamiozzo | 119/501 |
| 2014/0209036 A1 | * | 7/2014 | Cantwell et al. | 119/481 |

FOREIGN PATENT DOCUMENTS

| | | |
|---|---|---|
| EP | 1488283 A1 | 12/2004 |
| EP | 2249802 A2 | 11/2010 |

* cited by examiner

*Primary Examiner* — Rob Swiatek
*Assistant Examiner* — Magdalena Topolski
(74) *Attorney, Agent, or Firm* — Thompson Coburn LLP

(57) ABSTRACT

An animal kennel comprises front, rear, top, bottom, and opposite side walls that collectively define a cavity. At least a portion of the cavity has a horizontal cross-section that is bordered by the front, rear, and opposite side walls. The cross-section has a front portion and a rear portion. The front portion is narrower between the opposite side walls than the rear portion. A majority of each of the front, rear, top, bottom and opposite side walls is formed of a material that is translucent and radiolucent.

12 Claims, 2 Drawing Sheets

ANIMAL KENNEL FOR SCIENTIFIC EXAMINATION

CROSS-REFERENCE TO RELATED APPLICATIONS

Not Applicable.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention pertains generally to animal kennels. More particularly, the present invention pertains to a kennel for medical or scientific examination of conscious animals. The kennel preferably has a trapezoidal shape that is configured to orient an animal along the centerline of the kennel for behavioral assays. The walls of the kennel are translucent and radiolucent in manner allowing visual observation and radiographic imaging in the lateral, anterior-posterior, and dorsal-ventral orientations.

2. General Background

Typical animal kennels are not well suited for behavioral and radiographic examination of freely behaving dogs and other animals. Most kennels comprise metal walls (often wire mesh) which obstruct radiographic imaging and visual observation. Additionally, most kennels have a rectangular floor plan, which doesn't sufficiently restrain animal head movement.

Some scientific examination procedures involve the observation of self-feeding and swallowing behaviors of animals such as dogs and cats. In some cases it is desirable to record such behaviors using videofluoroscopy or other radiographic imaging. During such examinations, it is desirable to maintain the animal in a particular orientation. Unfortunately, it is difficult to properly orient animals placed in traditional kennels. For example, videofluoroscopic swallow testing routinely requires the use of animal restraint and force-feeding techniques that significantly increase the risk of radiation exposure for technicians while causing anxiety, struggling, and unnatural behaviors in animals.

SUMMARY OF THE INVENTION

In one aspect of the invention, an animal kennel comprises front, rear, top, bottom, and opposite side walls that collectively define a cavity. At least a portion of the cavity has a horizontal cross-section that is bordered by the front, rear, and opposite side walls. The cross-section has a front portion and a rear portion. The front portion is narrower between the opposite side walls than the rear portion. A majority of each of the front, rear, top, bottom and opposite side walls is formed of a material that is translucent and radiolucent.

Another aspect of the invention, a trapezoidal animal kennel comprises front, rear, top, bottom, and opposite side walls that collectively define a cavity. The cavity has a trapezoidal horizontal cross-section that is bordered by the front, rear, and opposite side walls. The cross-section has a front portion and a rear portion. The front portion is narrower between the opposite side walls than the rear portion. The cross-section has side portions of approximately equal length. A majority of each of the front, rear, top, bottom and opposite side walls is formed of a material that is translucent and radiolucent.

Further features and advantages of the present invention, as well as the operation of the invention, are described in detail below with reference to the accompanying drawings.

Figure 1:
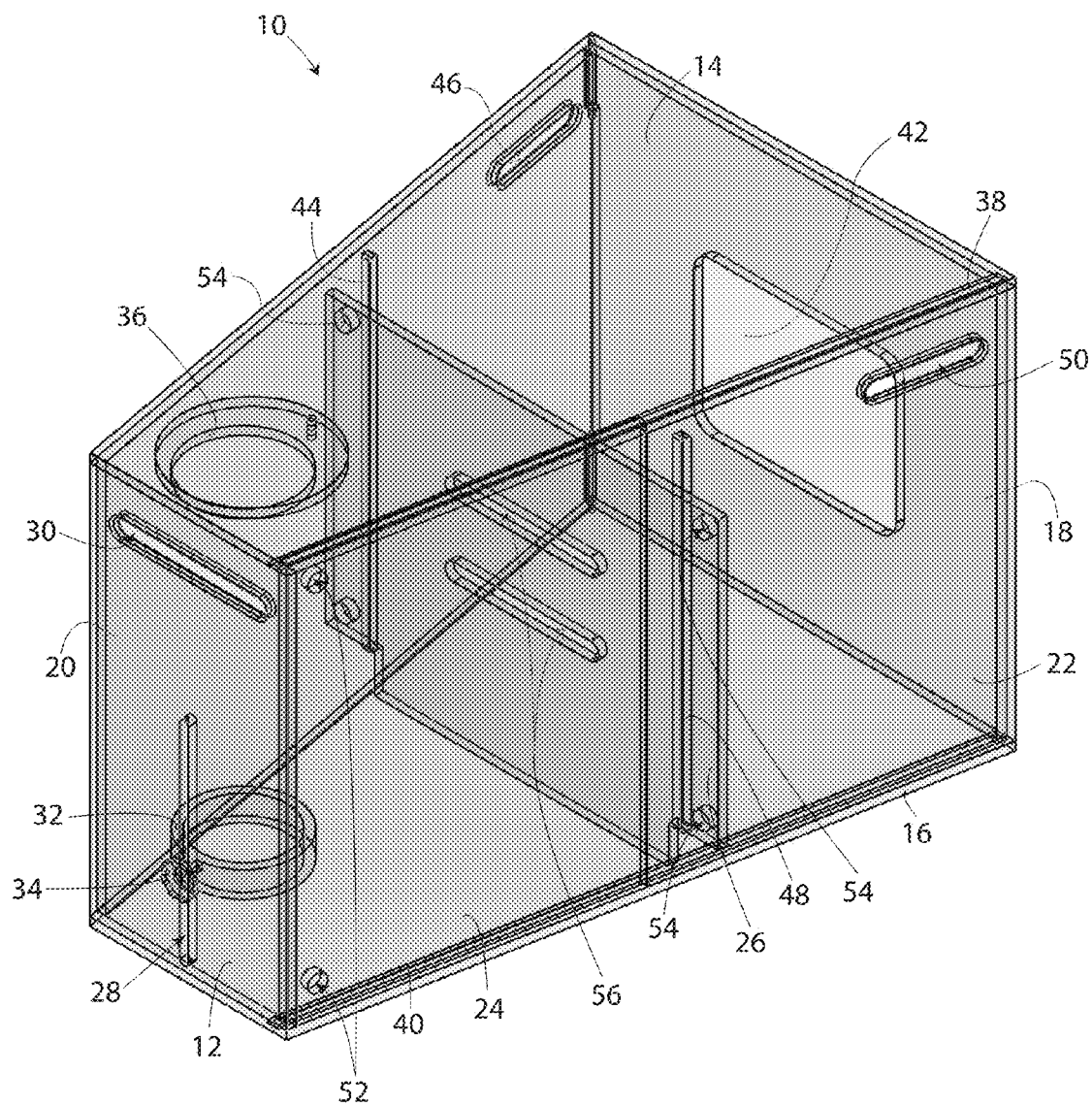
FIG. 1 is a perspective view showing the animal kennel with its optional partition wall in place.
Figure 2:
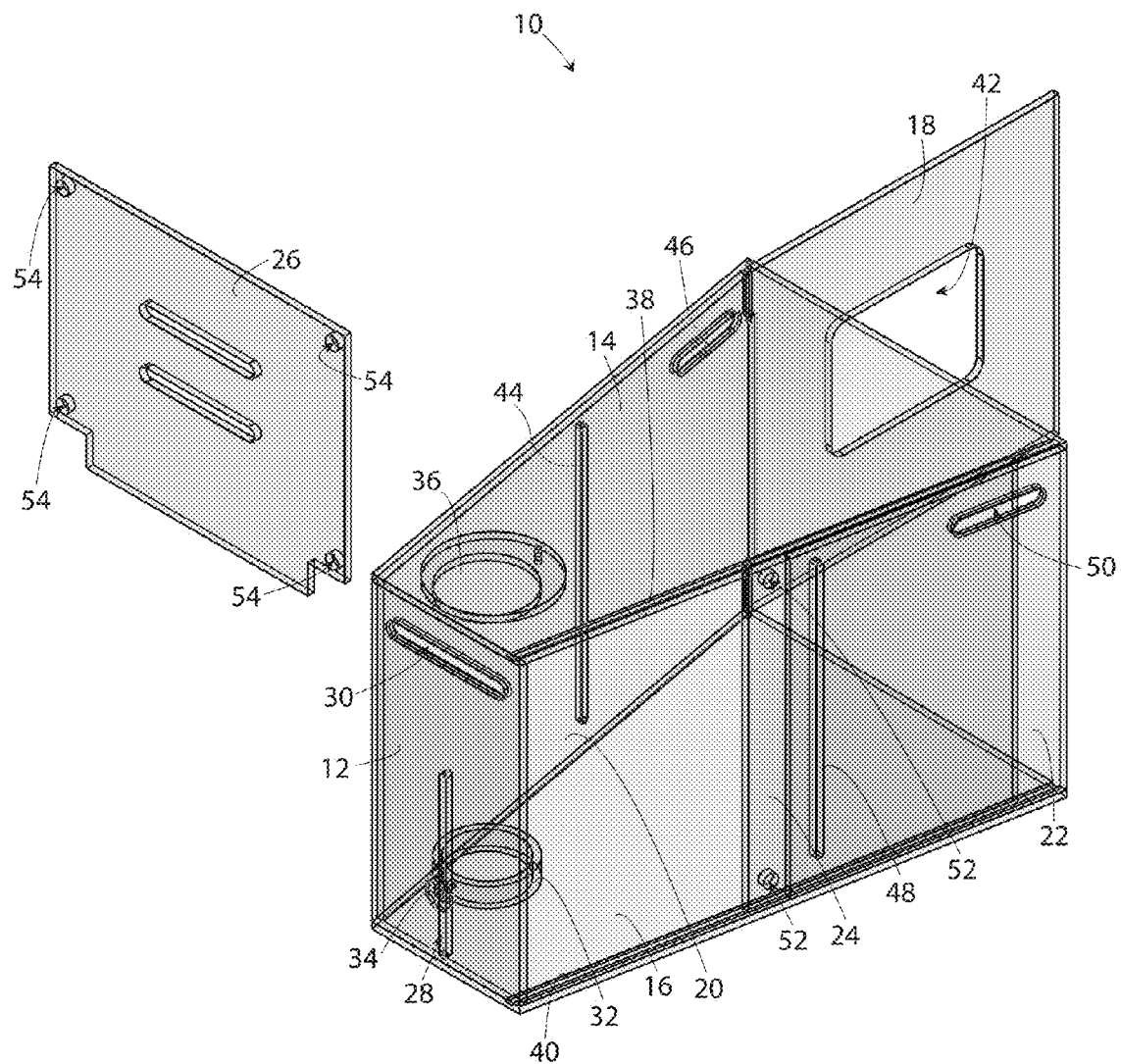
FIG. 2 is a perspective view of the kennel showing the rear wall and side door opened and the partition removed.

Reference numerals in the written specification and in the drawing figures indicate corresponding items.

DESCRIPTION OF THE PREFERRED EMBODIMENT

A preferred embodiment of an animal kennel 10 in accordance with the invention is shown in the drawing figures. The animal kennel comprises a front wall 12, a top wall 14, a bottom wall 16, a rear wall 18, a left wall 20, a fixed right wall 22, a movable right wall 24, and a partition 26. Preferably all of the walls (and other components of the kennel 10) are formed of a translucent and radiolucent material such as Lexan® polycarbonate. Lexan® polycarbonate is highly translucent and therefore the kennel is nearly transparent. Preferably the walls of the kennel 10 are approximately half an inch thick.

The front wall 12 of the kennel 10 comprises a vertical slot 28 and a handle/ventilation opening 30. A food bowl holder 32 is mounted to the interior surface of the front wall 12 via an adjustment knob 34 that extends through the vertical slot 28 of the front wall. The food bowl holder 32 is ring-shaped and is configured to support a food dish. The adjustment knob 34 allows the food bowl holder 32 to be raised and lowered within the kennel 10 from outside the kennel. Preferably a vertical scale (not shown) is etched into the front wall 12 adjacent the vertical slot 28. The scale allows the food bowl holder 32 to be repositioned with greater accuracy.

The top wall 14 is preferably trapezoidal in shape, with the rear of the top wall being wider than the front. The top wall 14 preferably comprises an access cover 36 which covers an opening that extends through the top wall above the food bowl holder 32. Pivoting the access cover 36 uncovers the opening to thereby allow a person to service a food bowl mounted on the food bowl holder 32 of the kennel 10. The top wall 14 also comprises a door channel 38 that runs parallel to and adjacent the right side of the top wall. The door channel 38 is formed into the bottom surface of the top wall 14.

The bottom 16 wall is preferably the same shape as the top wall and also comprises a door channel 40 that runs parallel to and adjacent the right side of the bottom wall. However, unlike the door channel 38 of the top wall 14, the door channel 40 of the bottom wall 16 is formed into the top surface of the bottom wall.

The rear wall 18 is generally rectangular and is hingedly attached to the rear of the left wall 20. The rear wall 18 preferably comprises a relatively large window 42 which is covered by a plastic screen (not shown). The window 42 provides ventilation. Although not shown, the rear wall 18 also preferably comprises a latch that selectively latches the rear wall closed.

The left wall 20 is also generally rectangular and comprises a vertical slot 44 and a handle/ventilation opening 46. The vertical slot 44 is configured and adapted to receive the partition 26. The handle/ventilation opening 46 is preferably positioned near the rear of the kennel 10.

The fixed right wall 22 also comprises a vertical slot 48 and a handle/ventilation opening 50. The fixed right wall 22 is secured between the top wall 14 and the bottom wall 16 and is aligned with the rear of the kennel 10. The vertical slot 48 is adjacent the front of the fixed right wall 22 and is configured to receive the partition 26. The handle/ventilation opening 50 is preferably positioned near the rear of the kennel 10.

The movable right wall 24 is generally rectangular and comprises a plurality of finger/ventilation openings 52. The top of the movable right wall 24 preferably extends into the door channel 38 of the top wall 14. Likewise, the bottom of the movable right wall 24 preferably extends into the door channel 40 of the bottom wall 16. The movable right wall 24 allows the interior of the kennel 10 to be accessed from the right side of the kennel by sliding the movable right wall toward the rear of the kennel. The finger/ventilation openings 52 facilitate such movement. When cleaning the kennel 10, the movable right wall 24 can be removed from the kennel 10 by sliding out to the rear of the kennel when the rear wall 18 is pivoted open.

The partition 26 is configured to pass through the vertical slots 44, 48 in the left wall 20 and the fixed right wall 22. The partition 26 comprises a plurality of finger openings 54 and a plurality of ventilation slots 56. The finger openings 54 facilitate the removal and installation of the partition 26.

In use, an animal is placed headfirst into the kennel from the rear of the kennel 10 with the rear wall 18 pivoted open. The trapezoidal shape of the kennel 10 provides adequate room for the body of the animal while it also confines the animal's head. With the animal in the kennel 10, the rear wall 18 can be swung closed and latched. If the animal is relatively small compared to the kennel 10, the partition 26 can be inserted behind the animal through the vertical slots 44, 48 in the left wall 20 and the fixed right wall 22.

In view of the foregoing, it should be appreciated that the invention achieves several advantages over prior art animal kennels. For example, the translucency of the kennel allows for the video recordation of animal behavior from all angles. Similarly, the radiolucency of the kennel allows for unobstructed videofluoroscopy or other radiographic imaging from all angles. Still further, the narrowness of the front of the kennel relative to the rear of kennel facilitates the proper alignment of the animal for examination/observation.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. An animal kennel comprising front, rear, top, bottom, and opposite side walls that collectively define a cavity, at least a portion of the cavity having a horizontal cross-section that is bordered by the front, rear, and opposite side walls, the cross-section being generally trapezoidal in shape and having a front portion and a rear portion, the front portion being narrower between the opposite side walls than the rear portion, a majority of each of the front, rear, top, bottom and opposite side walls being formed of a material that is translucent and radiolucent, the rear wall extending the width between the sidewalls at the rear portion of the cross-section and the height between the top and bottom walls, the entire rear wall being hinged to one of the side walls such that the rear wall is configured to selectively create an opening that permits access into the cavity from an environment exterior to the kennel.

2. An animal kennel in accordance with claim 1 wherein the kennel comprises a food container holder located within the cavity adjacent the front wall, the food container holder being secured in position.

3. An animal kennel in accordance with claim 2 wherein the food container holder is adjustable in a manner such that the food container holder can be secured above the bottom wall at various distances.

4. An animal kennel in accordance with claim 1 wherein the side walls are each generally planar and vertically oriented and converge toward each other as they extend from the rear wall to the front wall.

5. An animal kennel in accordance with claim 1 comprising a removable partition that defines a trapezoidal front portion of the cavity and a trapezoidal rear portion of the cavity.

6. An animal kennel in accordance with claim 1 wherein at least one of the side walls comprises a sliding door that is configured to horizontally slide open in a manner selectively-creating an opening that permits access directly into the front portion of the cross-section of the cavity from the environment exterior to the kennel, the sliding door remaining within the trapezoidal shape of the cross-section when the sliding door is slid open.

7. A trapezoidal animal kennel comprising front, rear, top, bottom, and opposite side walls that collectively define a cavity that has a trapezoidal horizontal cross-section that is bordered by the front, rear, and opposite side walls, the cross-section having a front portion and a rear portion, the front portion being narrower between the opposite side walls than the rear portion, the cross-section having side portions of approximately equal length, a majority of each of the front, rear, top, bottom and opposite side walls being formed of a material that is translucent and radiolucent, at least one of the side walls comprising a sliding door that is configured to horizontally slide open in a manner selectively-creating an opening that permits access directly into the front portion of the cross-section of the cavity from an environment exterior to the kennel, the sliding door remaining within the trapezoidal shape of the cross-section when the sliding door is slid open.

8. A trapezoidal animal kennel in accordance with claim 7 wherein the kennel comprises a food container holder located within the cavity adjacent the front wall, the food container holder being secured in position, and wherein at least a portion of the rear wall is configured to selectively create an opening that permits access into the cavity from the environment exterior to the kennel.

9. A trapezoidal animal kennel in accordance with claim 8 wherein the kennel comprises a removable partition that defines a trapezoidal front portion of the cavity and a trapezoidal rear portion of the cavity.

10. A trapezoidal animal kennel in accordance with claim 8 wherein the food container holder is adjustable in a manner such that the food container holder can be secured above the bottom wall at various distances.

11. A trapezoidal animal kennel in accordance with claim 7 comprising a removable partition that defines a trapezoidal front portion of the cavity and a trapezoidal rear portion of the cavity.

12. A trapezoidal animal kennel in accordance with claim 11 wherein the rear wall extends the width between the sidewalls at the rear portion of the cross-section and the height between the top and bottom walls, the entire rear wall is hinged to one of the side walls such that the rear wall is configured to selectively create an opening that permits access into the cavity from an environment exterior to the kennel.

* * * * *